(12) United States Patent
Das Sharma et al.

(10) Patent No.: US 11,726,939 B2
(45) Date of Patent: *Aug. 15, 2023

(54) FLEX BUS PROTOCOL NEGOTIATION AND ENABLING SEQUENCE

(71) Applicant: Intel Corporation, Santa Clara, CA (US)

(72) Inventors: Debendra Das Sharma, Saratoga, CA (US); Michelle C. Jen, Mountain View, CA (US); Prahladachar Jayaprakash Bharadwaj, Bangalore (IN); Bruce Tennant, Hillsboro, OR (US); Mahesh Wagh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,337

(22) Filed: Sep. 25, 2021

(65) Prior Publication Data

US 2022/0012203 A1    Jan. 13, 2022

Related U.S. Application Data

(63) Continuation of application No. 16/812,156, filed on Mar. 6, 2020, now Pat. No. 11,144,492, which is a continuation of application No. 16/171,342, filed on Oct. 25, 2018, now Pat. No. 10,606,785.

(60) Provisional application No. 62/667,324, filed on May 4, 2018.

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0026* (2013.01)

(58) Field of Classification Search
CPC .................. G06F 13/4027; G06F 13/4282
USPC ............................................... 710/313
See application file for complete search history.

(56) References Cited

U.S. PATENT DOCUMENTS

| | | | |
|---|---|---|---|
| 5,142,528 | A | 8/1992 | Kobayashi et al. |
| 6,259,699 | B1 | 7/2001 | Opalka et al. |
| 6,901,457 | B1 | 5/2005 | Toombs et al. |
| 7,899,943 | B2 | 3/2011 | Ajanovic et al. |
| 7,907,546 | B1 | 3/2011 | Prohofsky |
| 10,061,731 | B1 | 8/2018 | Kawai et al. |
| 10,606,785 | B2 | 3/2020 | Sharma et al. |

(Continued)

OTHER PUBLICATIONS

PCI Express Base Specification Revision 3.0; Nov. 10, 2010.

(Continued)

*Primary Examiner* — Paul R. Myers
(74) *Attorney, Agent, or Firm* — Alliance IP, LLC

(57) ABSTRACT

Systems, methods, and devices can involve a host device that includes a root complex, a link, and an interconnect protocol stack coupled to a bus link. The interconnect protocol stack can include multiplexing logic to select one of a Peripheral Component Interconnect Express (PCIe) upper layer mode, or an accelerator link protocol upper layer mode, the PCIe upper layer mode or the accelerator link protocol upper layer mode to communicate over the link, and physical layer logic to determine one or more low latency features associated with one or both of the PCIe upper layer mode or the accelerator link protocol upper layer mode.

20 Claims, 14 Drawing Sheets

(56) References Cited

U.S. PATENT DOCUMENTS

| | | |
|---|---|---|
| 11,144,492 B2 * | 10/2021 | Das Sharma ....... G06F 13/4282 |
| 2003/0120791 A1 | 6/2003 | Weber et al. |
| 2014/0244814 A1 | 8/2014 | Kuzmack et al. |
| 2016/0306922 A1 | 10/2016 | Rooyen et al. |
| 2017/0168966 A1 | 6/2017 | Mishra et al. |
| 2017/0337570 A1 | 11/2017 | Astigarraga et al. |
| 2018/0024960 A1 | 1/2018 | Wagh et al. |
| 2018/0132116 A1 | 5/2018 | Shekhar et al. |
| 2018/0232324 A1 | 8/2018 | Mishra et al. |
| 2018/0329838 A1 | 11/2018 | Mishra et al. |
| 2018/0329855 A1 | 11/2018 | Sharma |
| 2019/0004990 A1 | 1/2019 | Doren et al. |
| 2019/0007310 A1 | 1/2019 | Sharma et al. |
| 2019/0042380 A1 | 2/2019 | Sharma et al. |
| 2019/0042510 A1 | 2/2019 | Ngau et al. |
| 2019/0065426 A1 | 2/2019 | Sharma et al. |
| 2019/0102311 A1 | 4/2019 | Gupta et al. |

OTHER PUBLICATIONS

Sekar, Krishna, et al., "Flexbus: A High-Performance System-on-Chip Communication Architecture with a Dynamically Configurable Topology", DAC 2005, Jun. 13-17, 2005, Anaheim, California, 4 pages.

* cited by examiner

FLEX BUS PROTOCOL NEGOTIATION AND ENABLING SEQUENCE

REFERENCE TO RELATED APPLICATION

This application is a continuation (and claims the benefit of priority under 35 U.S.C. § 120) of U.S. patent application Ser. No. 16/812,156 filed on Mar. 6, 2020, entitled FLEX BUS PROTOCOL NEGOTIATION AND ENABLING SEQUENCE, which application is a continuation (and claims the benefit of priority under 35 U.S.C. § 120) of U.S. patent application Ser. No. 16/171,342 filed on Oct. 25, 2018, entitled FLEX BUS PROTOCOL NEGOTIATION AND ENABLING SEQUENCE, which claims the benefit of U.S. Provisional Patent Application Ser. No. 62/667,324 filed May 4, 2018, the entire contents of which applications are incorporated by reference herein.

BACKGROUND

Computing systems typically include multiple interconnects to facilitate communication between system components, such as processors and memory. In addition, interconnects may also be used to support add-on devices, for instance, input/output (IO) devices and expansion cards. Furthermore, different market segments need different interconnect architectures to suit the market's needs and different interconnect connections. Non-limiting examples of typical interconnects may include peripheral component interconnect express (PCIe), intra-device interconnect (IDI), and Intel® ultra-path interconnect (UPI or Intel® UPI).

DETAILED DESCRIPTION

Figure 1:
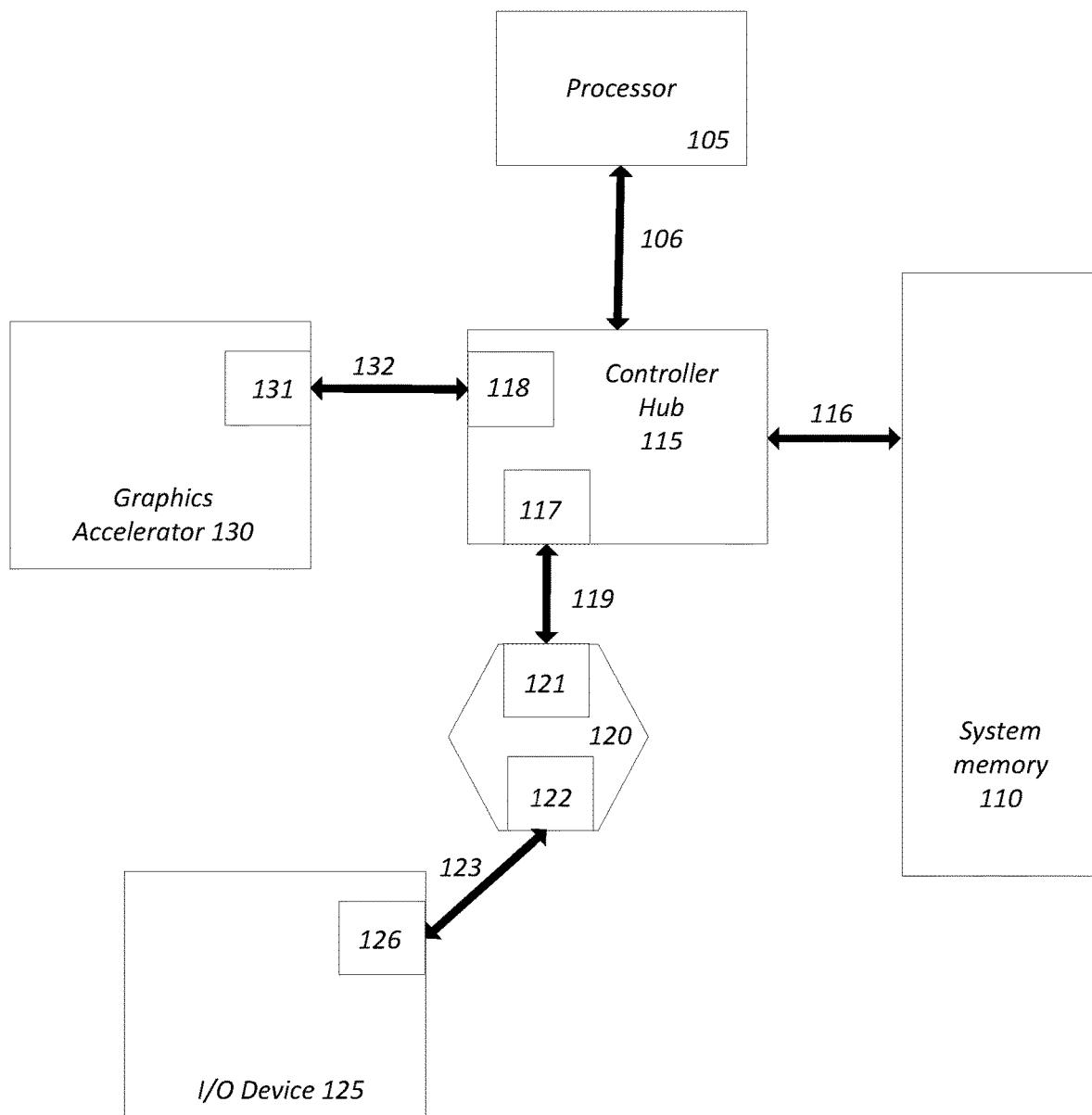
FIG. 1 is a schematic diagram of a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present disclosure. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective markets. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples (e.g., Ultrapath Interconnect (UPI)), can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the disclosure described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
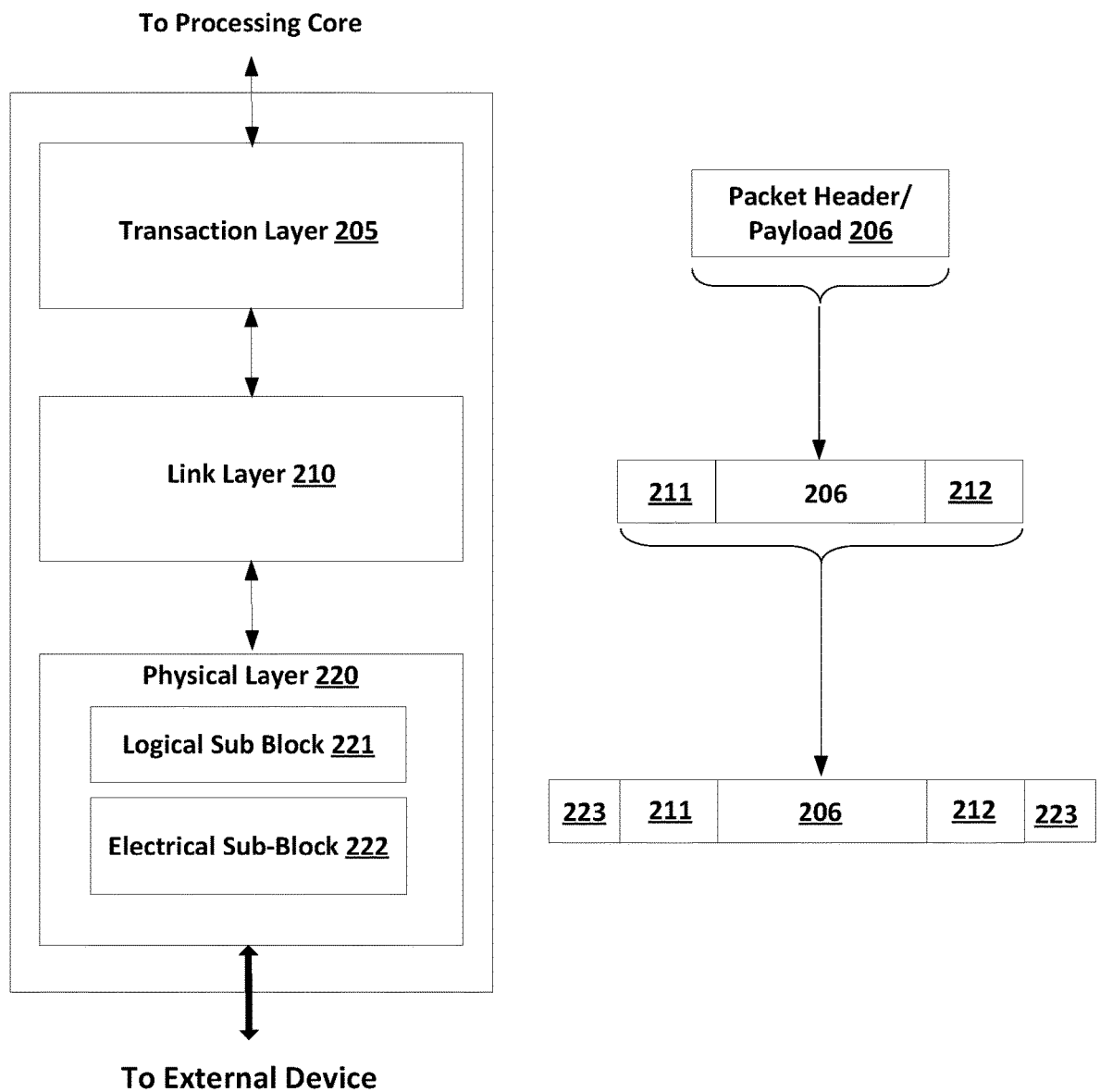
FIG. 2 is a schematic diagram of a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
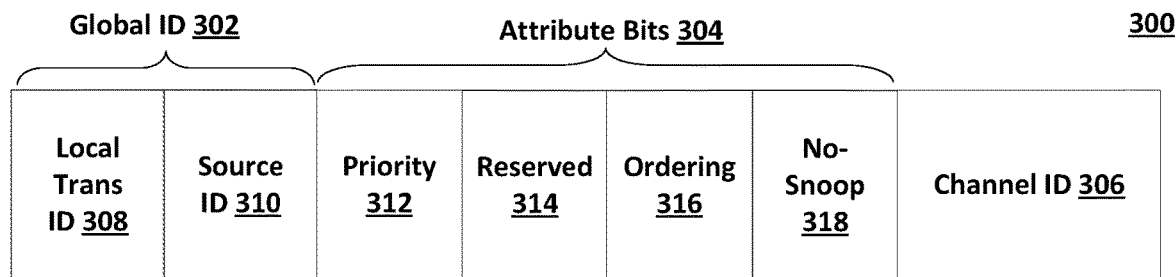
FIG. 3 is a schematic diagram of an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304, and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e., an identification number or packet number, calculates and applies an error detection code, i.e., CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 220. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
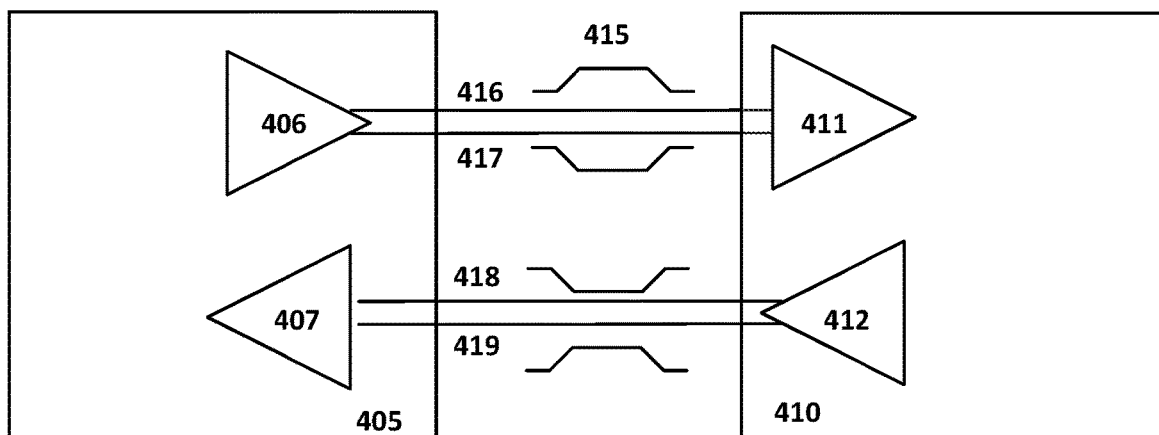
FIG. 4 is a schematic diagram of an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

INTEL® accelerator Link (IAL) or other technologies (e.g., GenZ, CAPI, OpenCAPI specification, CCIX, NVLink, etc.) define a general purpose memory interface that allows memory associated with a discrete device, such as an accelerator, to serve as coherent memory. In many cases, the discrete device and associated memory may be a connected card or in a separate chassis from the core processor(s). The result of the introduction of device-associated coherent memory is that device memory is not tightly coupled with the CPU or platform. Platform specific firmware cannot be expected to be aware of the device details. For modularity and interoperability reasons, memory initialization responsibilities must be fairly divided between platform specific firmware and device specific firmware/software.

This disclosure describes an extension to the existing Intel Accelerator Link (IAL) architecture. IAL uses a combination of three separate protocols, known as IAL.io, IAL.cache, and IAL.mem to implement IAL's Bias Based Coherency model (hereinafter, Coherence Bias Model). The Coherence Bias Model can facilitate high performance in accelerators while minimizing coherence overhead. This disclosure provides a mechanism to allow an accelerator to implement the Coherence Bias Model using the IAL.io & IAL.mem protocol (with or without IAL.cache).

IAL.io is a PCIe-compatible input/output (IO) protocol used by IAL for functionalities such as discovery, configuration, initialization, interrupts, error handling, address translation service, etc. IAL.io is non-coherent in nature, supports variable payload sizes and follows PCIe ordering rules. IAL.io is similar in functionality to Intel On-chip System Fabric (IOSF). IOSF is a PCIe protocol repackaged for multiplexing, used for discovery, register access, interrupts, etc.

IAL.mem is an I/O protocol used by the host to access data from a device attached memory. IAL.mem allows a device attached memory to be mapped to the system coherent address space. IAL.mem also has snoop and metadata semantics to manage coherency for device side caches. IAL.mem is similar to SMI3 that controls memory flows.

IAL.cache is an I/O protocol used by the device to request cacheable data from a host attached memory. IAL.cache is non-posted and unordered and supports cacheline granular payload sizes. IAL.cache is similar to the Intra Die Interconnect (IDI) protocol used for coherent requests and memory flows.

This disclosure uses IAL attached memory (IAL.mem protocol) as an example implementation, but can be extended to other technologies as well, such as those proliferated by the GenZ consortium or the CAPI or OpenCAPI specification, CCIX, NVLink, etc. The IAL builds on top of PCIe and adds support for coherent memory attachment. In general, however, the systems, devices, and programs described herein can use other types of input/output buses that facilitate the attachment of coherent memory.

This disclosure describes methods that the accelerator can use to cause page bias flips from Host to Device Bias over IAL.io. The methods described herein retain many of the advanced capabilities of an IAL accelerator but with simpler device implementation. Both host and device can still get full bandwidth, coherent, and low latency access to accelerator attached memory and the device can still get coherent but non-cacheable access to host attached memory.

The methods described herein can also reduce security related threats from the device because the device cannot send cacheable requests to host attached memory on IAL.cache.

Figure 5:
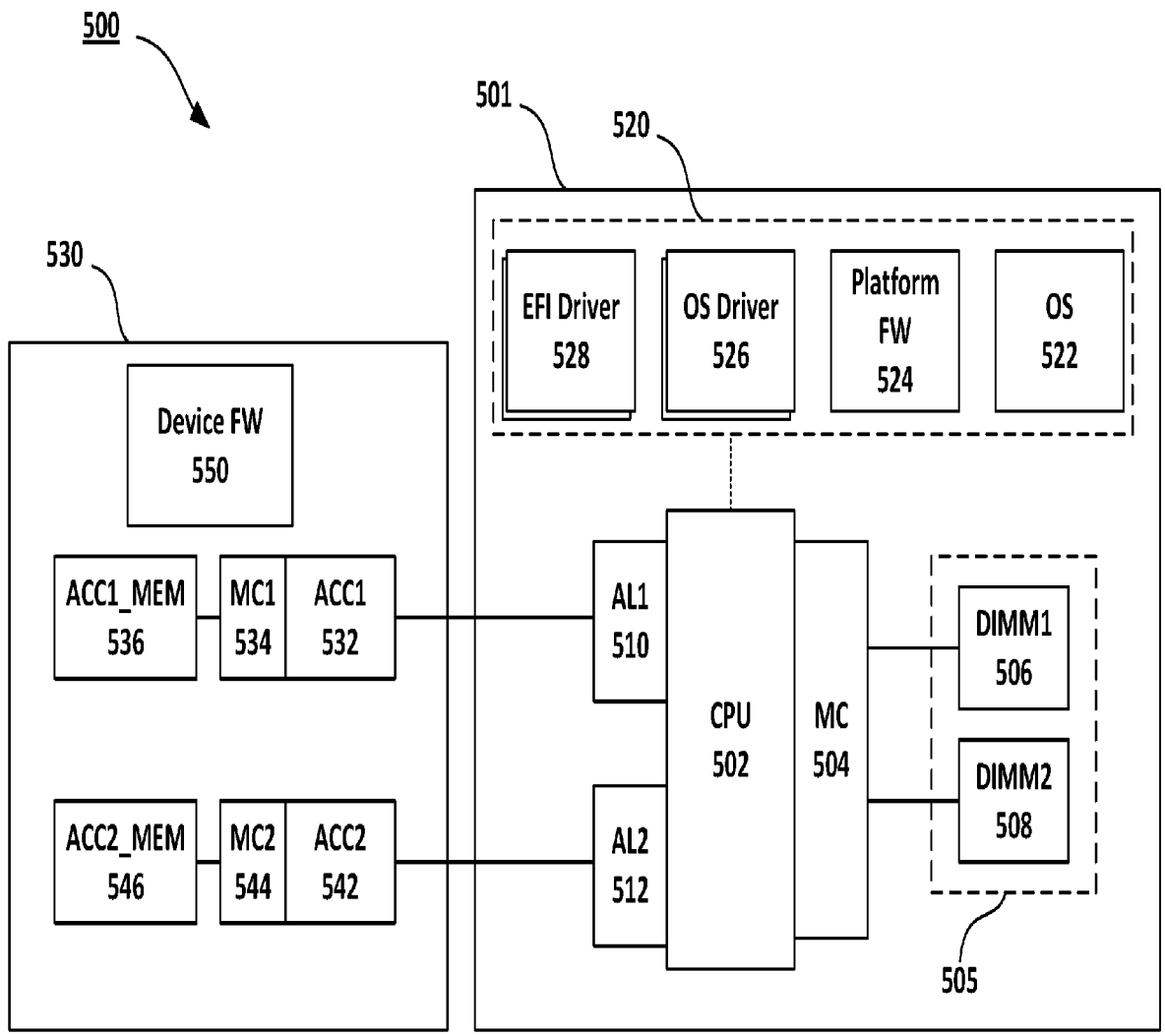
FIG. 5 is a schematic diagram of a processing system that includes a connected accelerator in accordance with embodiments of the present disclosure.

FIG. 5 is a schematic diagram of a processing system 500 that includes a connected accelerator in accordance with embodiments of the present disclosure. The processing system 500 can include a host device 501 and a connected device 530. The connected device 530 can be a discrete device connected across a IAL-based interconnect, or by another similar interconnect. The connected device 530 can be integrated within a same chassis as the host device 501 or can be housed in a separate chassis.

The host device 501 can include a processor core 502 (labelled as CPU 502). The processor core 502 can include one or more hardware processors. The processor core 502 can be coupled to memory module 505. The memory module 505 can include double data rate (DDR) interleaved memory, such as dual in-line memory modules DIMM1 506 and DIMM2 508, but can include more memory and/or other types of memory, as well. The host device 501 can include a memory controller 504 implemented in one or a combination of hardware, software, or firmware. The memory controller 504 can include logic circuitry to manage the flow of data going to and from the host device 501 and the memory module 505.

A connected device 530 can be coupled to the host device 501 across an interconnect. As an example, the connected device 530 can include accelerators ACC1 532 and ACC2 542. ACC1 532 can include a memory controller MC1 534 that can control a coherent memory ACC1_MEM 536. ACC2 542 can include a memory controller MC2 544 that can control a coherent memory ACC2_MEM 546. The connected device 530 can include further accelerators, memories, etc. ACC1_MEM 536 and ACC2_MEM 546 can be coherent memory that is used by the host processor; likewise, the memory module 505 can also be coherent memory. ACC1_MEM 536 and ACC2_MEM 546 can be or include host-managed device memory (HDM).

The host device 501 can include software modules 520 for performing one or more memory initialization procedures. The software modules 520 can include an operating system (OS) 522, platform firmware (FW) 524, one or more OS drivers 526, and one or more EFI drivers 528. The software modules 520 can include logic embodied on non-transitory machine readable media, and can include instructions that when executed cause the one or more software modules to initialize the coherent memory ACC1_MEM 536 and ACC2_MEM 546.

For example, platform firmware 524 can determine the size of coherent memory ACC1_MEM 536 and ACC2_MEM 546 and gross characteristics of memory early during boot-up via standard hardware registers or using Designated Vendor-Specific Extended Capability Register (DVSEC). Platform firmware 524 maps device memory ACC1_MEM 536 and ACC2_MEM 546 into coherent address spaces. Device firmware or software 550 performs device memory initialization and signals platform firmware 524 and/or system software 520 (e.g., OS 522). Device firmware 550 then communicates detailed memory characteristics to platform firmware 524 and/or system software 520 (e.g., OS 522) via software protocol.

Figure 6:
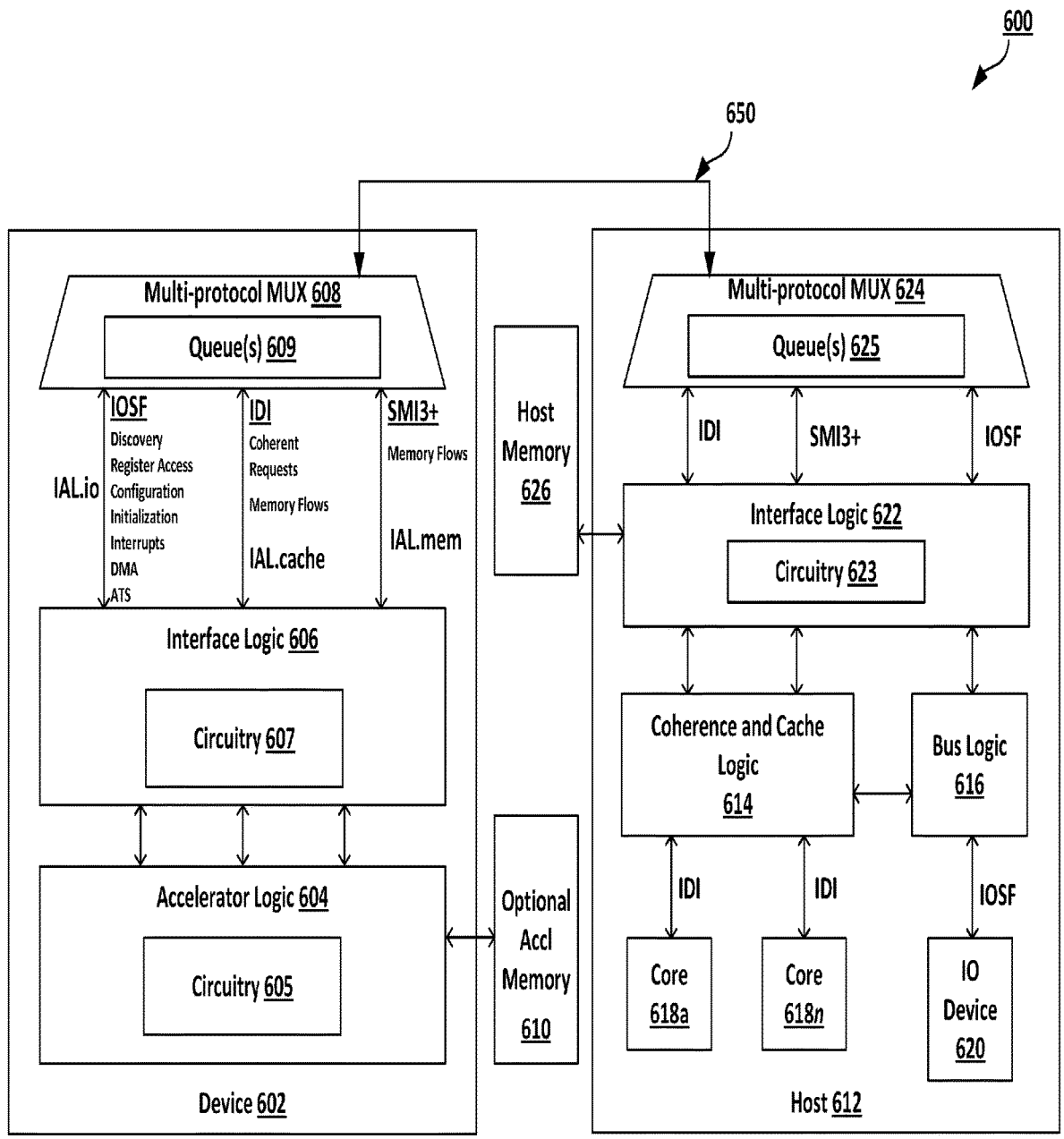
FIG. 6 is a schematic diagram of an example computing system in accordance with embodiments of the present disclosure.

FIG. 6 illustrates an example of an operating environment 600 that may be representative of various embodiments. The operating environment 600 depicted in FIG. 6 may include a device 602 operative to provide processing and/or memory capabilities. For example, device 602 may be, an accelerator or processor device communicatively coupled to a host processor 612 via an interconnect 650, which may be single interconnect, bus, trace, and so forth. The device 602 and host processor 612 may communicate over link 650 to enable data and message to pass there between. In some embodiments, link 650 may be operable to support multiple protocols and communication of data and messages via the multiple interconnect protocols. For example, the link 650 may support various interconnect protocols, including, without limitation, a non-coherent interconnect protocol, a coherent interconnect protocol, and a memory interconnects protocol. Non-limiting examples of supported interconnect protocols may include PCI, PCIe, USB, IDI, IOSF, SMI, SMI3, IAL.io, IAL.cache, and IAL.mem, and/or the like. For example, the link 650 may support a coherent interconnect protocol (for instance, IDI), a memory interconnect protocol (for instance, SMI3), and non-coherent interconnect protocol (for instance, IOSF).

In embodiments, the device 602 may include accelerator logic 604 including circuitry 605. In some instances, the accelerator logic 604 and circuitry 605 may provide processing and memory capabilities. In some instances, the accelerator logic 604 and circuitry 605 may provide additional processing capabilities in conjunction with the processing capabilities provided by host processor 612. Examples of device 602 may include producer-consumer devices, producer-consumer plus devices, software assisted device memory devices, autonomous device memory devices, and giant cache devices, as previously discussed. The accelerator logic 604 and circuitry 605 may provide the processing and memory capabilities based on the device. For example, the accelerator logic 604 and circuitry 605 may communicate using interconnects using, for example, a coherent interconnect protocol (for instance, IDI) for various functions, such as coherent requests and memory flows with host processor 612 via interface logic 606 and circuitry 607. The interface logic 606 and circuitry 607 may determine an interconnect protocol based on the messages and data for communication. In another example, the accelerator logic 604 and circuitry 605 may include coherence logic that includes or accesses bias mode information. The accelerator logic 604 including coherence logic may communicate the access bias mode information and related messages and data with host processor 612 using a memory interconnect protocol (for instance, SMI3) via the interface logic 606 and circuitry 607. The interface logic 606 and circuitry 607 may determine to utilize the memory interconnect protocol based on the data and messages for communication.

In some embodiments, the accelerator logic 604 and circuitry 605 may include and process instructions utilizing a non-coherent interconnect, such as a fabric-based protocol (for instance, IOSF) and/or a peripheral component interconnect express (PCIe) protocol. In various embodiments, a non-coherent interconnect protocol may be utilized for various functions, including, without limitation, discovery, register access (for instance, registers of device 602), configuration, initialization, interrupts, direct memory access, and/or address translation services (ATS). Note that the device 602 may include various accelerator logic 604 and circuitry 605 to process information and may be based on the type of device, e.g. producer-consumer devices, producer-consumer plus devices, software assisted device memory devices, autonomous device memory devices, and giant cache devices. Moreover and as previously discussed, depending on the type of device, device 602 including the interface logic 606, the circuitry 607, the protocol queue(s) 609 and multi-protocol multiplexer 608 may communicate in accordance with one or more protocols, e.g. non-coherent, coherent, and memory interconnect protocols. Embodiments are not limited in this manner.

In various embodiments, host processor 612 may be similar to processor 105, as discussed in FIG. 1, and include similar or the same circuitry to provide similar functionality. The host processor 612 may be operably coupled to host memory 626 and may include coherence logic (or coherence and cache logic) 614, which may include a cache hierarchy and have a lower level cache (LLC). Coherence logic 614 may communicate using various interconnects with interface logic 622 including circuitry 623 and one or more cores 618a-n. In some embodiments, the coherence logic 614 may enable communication via one or more of a coherent interconnect protocol, and a memory interconnect protocol. In some embodiments, the coherent LLC may include a combination of at least a portion of host memory 626 and accelerator memory 610. Embodiments are not limited in this manner.

Host processor 612 may include bus logic 616, which may be or may include PCIe logic. In various embodiments, bus logic 616 may communicate over interconnects using a non-coherent interconnect protocol (for instance, IOSF) and/or a peripheral component interconnect express (PCIe or PCI-E) protocol. In various embodiments, host processor 612 may include a plurality of cores 618a-n, each having a cache. In some embodiments, cores 618a-n may include Intel® Architecture (IA) cores. Each of cores 618a-n may communicate with coherence logic 614 via interconnects. In some embodiments, the interconnects coupled with the cores 618a-n and the coherence and cache logic 614 may support a coherent interconnect protocol (for instance, IDI). In various embodiments, the host processor may include a device 620 operable to communicate with bus logic 616 over an interconnect. In some embodiments, device 620 may include an 1/0 device, such as a PCIe 1/0 device.

In embodiments, the host processor 612 may include interface logic 622 and circuitry 623 to enable multi-protocol communication between the components of the host processor 612 and the device 602. The interface logic 622 and circuitry 623 may process and enable communication of messages and data between the host processor 612 and the device 602 in accordance with one or more interconnect protocols, e.g. a noncoherent interconnect protocol, a coherent interconnect, protocol, and a memory interconnect protocol, dynamically. In embodiments, the interface logic 622 and circuitry 623 may support a single interconnect, link, or bus capable of dynamically processing data and messages in accordance with the plurality of interconnect protocols.

In some embodiments, interface logic 622 may be coupled to a multi-protocol multiplexer 624 having one or more protocol queues 625 to send and receive messages and data with device 602 including multi-protocol multiplexer 608 and also having one or more protocol queues 609. Protocol queues 609 and 625 may be protocol specific. Thus, each interconnect protocol may be associated with a particular protocol queue. The interface logic 622 and circuitry 623 may process messages and data received from the device 602 and sent to the device 602 utilizing the multi-protocol multiplexer 624. For example, when sending a message, the interface logic 622 and circuitry 623 may process the message in accordance with one of interconnect protocols based on the message. The interface logic 622 and circuitry 623 may send the message to the multi-protocol multiplexer 624 and a link controller. The multi-protocol multiplexer 624 or arbitrator may store the message in a protocol queue 625, which may be protocol specific. The multi-protocol multiplexer 624 and link controller may determine when to send the message to the device 602 based on resource availability in protocol specific protocol queues of protocol queues 609 at the multi-protocol multiplexer 608 at device 602. When receiving a message, the multi-protocol multiplexer 624 may place the message in a protocol-specific queue of queues 625 based on the message. The interface logic 622 and circuitry 623 may process the message in accordance with one of the interconnect protocols.

In embodiments, the interface logic 622 and circuitry 623 may process the messages and data to and from device 602 dynamically. For example, the interface logic 622 and circuitry 623 may determine a message type for each message and determine which interconnect protocol of a plurality of interconnect protocols to process each of the messages. Different interconnect protocols may be utilized to process the messages.

In an example, the interface logic 622 may detect a message to communicate via the interconnect 650. In embodiments, the message may have been generated by a core 618 or another I/O device 620 and be for communication to a device 602. The interface logic 622 may determine a message type for the message, such as a non-coherent message type, a coherent message type, and a memory message type. In one specific example, the interface logic 622 may determine whether a message, e.g. a request, is an I/O request or a memory request for a coupled device based on a lookup in an address map. If an address associated with the message maps as an I/O request, the interface logic 622 may process the message utilizing a non-coherent interconnect protocol and send the message to a link controller and the multi-protocol multiplexer 624 as a non-coherent message for communication to the coupled device. The multi-protocol 624 may store the message in an interconnect specific queue of protocol queues 625 and cause the message to be sent to device 602 when resources are available at device 602. In another example, the interface logic 622 may determine an address associated with the message indicates the message is memory request based on a lookup in the address table. The interface logic 622 may process the message utilizing the memory interconnect protocol and send the message to the link controller and multi-protocol multiplexer 624 for communication to the coupled device 602. The multi-protocol multiplexer 624 may store the message an interconnect protocol-specific queue of protocol queues 625 and cause the message to be sent to device 602 when resources are available at device 602.

In another example, the interface logic 622 may determine a message is a coherent message based on one or more cache coherency and memory access actions performed. More specifically, the host processor 612 may receive a coherent message or request that is sourced by the coupled device 602. One or more of the cache coherency and memory access actions may be performed to process the message and based on these actions; the interface logic 622 may determine a message sent in response to the request may be a coherent message. The interface logic 622 may process the message in accordance with the coherent interconnect protocol and send the coherent message to the link controller and multi-protocol multiplexer 624 to send to the coupled device 602. The multi-protocol multiplexer 624 may store the message in an interconnect protocol-specific queue of queues 625 and cause the message to be sent to device 602 when resources are available at device 602. Embodiments are not limited in this manner.

In some embodiments, the interface logic 622 may determine a message type of a message based on an address associated with the message, an action caused by the message, information within the message, e.g. an identifier, a source of the message, a destination of a message, and so forth. The interface logic 622 may process received messages based on the determination and send the message to the appropriate component of host processor 612 for further processing. The interface logic 622 may process a message to be sent to device 602 based on the determination and send the message to a link controller (not shown) and multi-protocol multiplexer 624 for further processing. The message types may be determined for messages both sent and received from or by the host processor 612.

Current IAL architecture may use a combination of 3 separate protocols, known as IAL.io, IAL.cache & IAL.mem to implement IAL's Bias Based Coherency model (henceforth called the 'Coherence Bias Model'). The Coherence Bias Model may facilitate accelerators to achieve high performance while minimizing coherence overhead In embodiments, IAL architecture may support 5 types of accelerator models as defined below.

| Accelerator Class | Description | Examples |
| --- | --- | --- |
| Producer-Consumer | Basic PCIe Devices | Network Accelerators Crypto Compression |

-continued

| Accelerator Class | Description | Examples |
|---|---|---|
| Producer-Consumer Plus | PCIe devices with additional capability Example: Special data operations such as atomics | Storm Lake Data Center Fabric Infiniband HBA |
| SW Assisted Device Memory | Accelerators with attached memory Usages where software "data placement" is practical | Discrete FPGA Graphics |
| Autonomous Device Memory | Accelerators with attached memory Usages where software "data placement" is not practical | Dense Computation Offload GPGPU |
| Giant Cache | Accelerators with attached memory Usages where data foot print is larger than attached memory | Dense Computation Offload GPGPU |

Various embodiments herein relate to data transmission on a computer bus.

It is noted that the flex bus technology, such as Intel® FlexBus technology, allows for multiple protocols to be multiplexed onto a set of off-package pins that use PCIe electricals. Flex bus technology can include system-on-chip designs to facilitate on-chip communications between upstream and downstream devices. The flux bus technology can include a dynamically configurable architecture. The architecture of the flex bus technology can facilitate system level topology adaptations (e.g., via dynamic bridge bypass) and component level topology adaptations (e.g., via component remapping).

The pins may, for example, be configured during discovery to support either a first interconnect protocol type (e.g., a PCIe protocol) or a second interconnect protocol type (e.g., an accelerator link protocol, such as, for example, Intel® Accelerator Link (IAL) protocol (dynamic multiplexing of caching, memory, and load/store semantics). Additionally, various latency optimizations may be enabled during discovery to satisfy requirements of latency sensitive applications that utilize the caching and memory semantics.

This disclosure describes a flex bus negotiation sequence using the PCIe alternate protocol negotiation mechanism. In embodiments, during negotiation, a decision may be made to enable either an accelerator link protocol (e.g., IAL, GenZ, CAPI, OpenCAPI specification, CCIX, NVLink, etc.), or a PCIe protocol over the flex bus link. It is noted that in the description that follows, the flex bus link will be repeatedly referred to, and the Intel® FlexBus is one example type of such flex bus link However, it is understood that this is a non-limiting example, and any equivalent technology is understood to be within the scope of the present disclosure and the various flex bus functionalities described.

In embodiments, if an accelerator link protocol is selected, various latency optimizations may also be negotiated, including, for example, sync header suppression, skip ordered set suppression, drift buffer mode, and bypass of lane-to-lane deskew. In embodiments, upper protocol layers may be notified early in the link initialization process once the negotiation is complete to provide lead time for any initialization required in the upper layers. However, in accordance with various embodiments, the physical layer may enable the negotiated protocols and latency optimizations later in the link initialization process.

This disclosure further describes a sequence for negotiating and enabling accelerator link protocols and features on a link that supports different interconnect protocols, e.g., Intel Flex Bus (or FlexBus) that supports IAL over PCIe electrical pins, during initialization. The term "flex bus link" is used below, but it is understood that other implementations of a link and communications topology that supports multiplexing interconnect protocols over a single set of electricals are contemplated by this application. Generally, a flex bus link can be a communications link that facilitates data and control information transfers between upstream and downstream devices and can accommodate multiple interconnect protocol types, such as PCIe or IAL, over a single set of electricals. The flex bus topology is described in more detail below.

Figure 7:
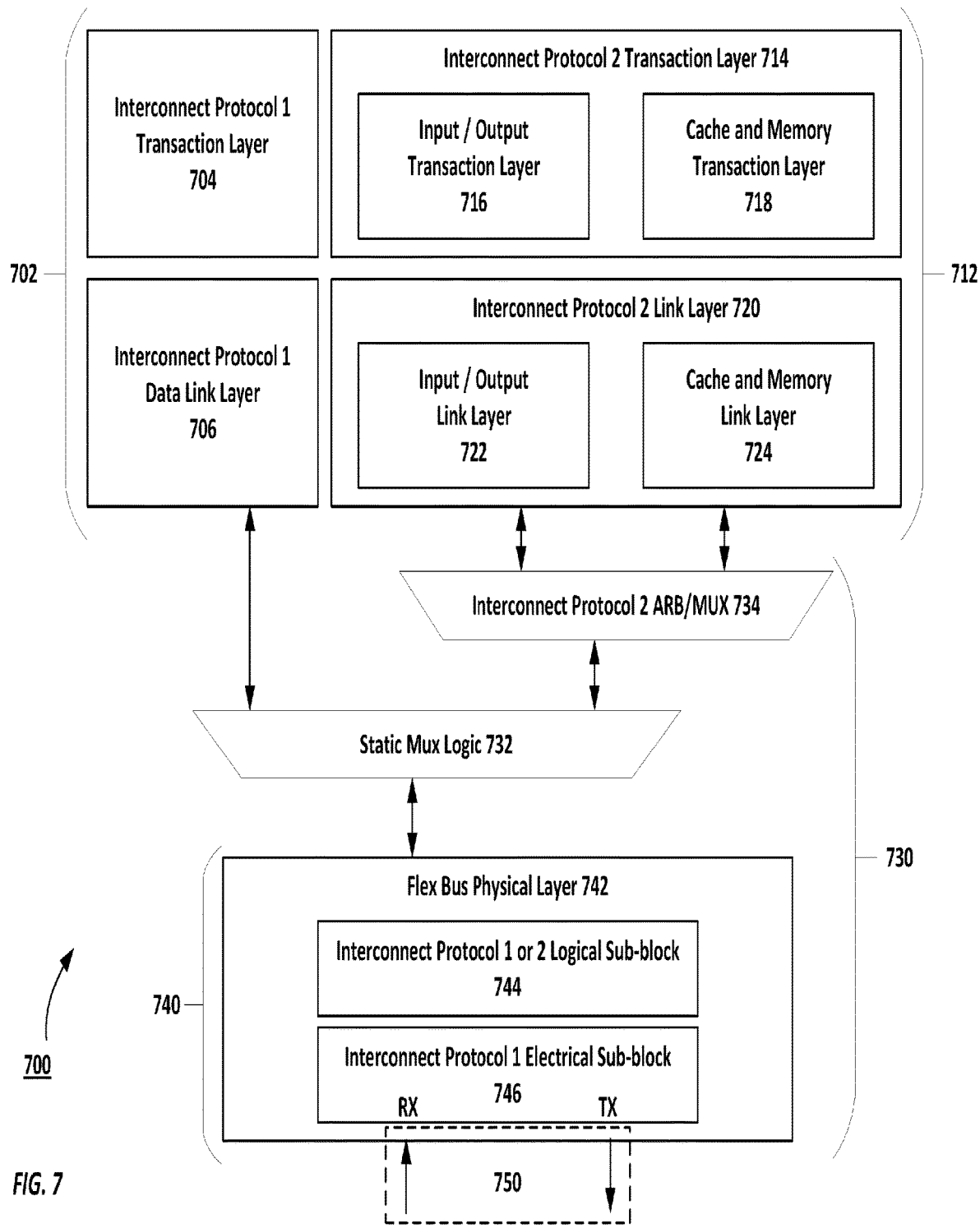
FIG. 7 is a schematic diagram of an example flex bus stack in accordance with embodiments of the present disclosure.

FIG. 7 is a schematic diagram of an example flex bus topology 700 in accordance with embodiments of the present disclosure. Flex bus topology 700 illustrates at a high-level various components for supporting multiple protocols across a link (such as a link compliant with a PCIe-based protocol). The flex bus topology 700 can support either Interconnect Protocol 1 upper layers 702 or Interconnect Protocol 2 upper layers 712. In the following example embodiment, Interconnect Protocol 1 702 is a PCIe-based protocol; and Interconnect Protocol 2 712 is an accelerator link protocol, such as IAL. The Interconnect Protocol 1 702 can include an Interconnect Protocol 1 Transaction Layer 704 and an Interconnect Protocol 1 Link Layer 706. the Interconnect Protocol 2 712 can include an Interconnect Protocol 2 Transaction Layer 714 and an Interconnect Protocol 2 Link Layer 720. The Interconnect Protocol 2 Transaction Layer 714 can include an input/output (I/O) transaction layer 716 (such as an I/O transaction layer to handle IAL.io protocols) and a cache and memory transaction layer 718 (such as those used to handle IAL.cache and IAL.mem transaction layer protocols). The Interconnect Protocol 2 Link Layer 720 can include an input/output (I/O) link layer 722 (such as an I/O link layer to handle IAL.io protocols) and a cache and memory link layer 724 (such as those used to handle IAL.cache and IAL.mem link layer protocols).

The flex bus topology 700 can include a fabric 730 to support the use of different interconnect protocols across a link 750. The fabric 730 includes multiplexing (MUX) logic (static mux logic 732 and Interconnect Protocol 2 MUX logic 734) and physical layer logic 740. During link initialization, the static multiplexing logic 732 may be configured to select either the PCIe upper layers (e.g., Interconnect Protocol 1 upper layers 702) or the accelerator link protocol upper layers (e.g., Interconnect Protocol 2 upper layer 712) to communicate over the link 750. If, for example, IAL mode is negotiated, MUX 734, such as, for example, the IAL MUX, may be additionally configured to enable only a single protocol, such as, for example, IAL.io, or to enable multiple protocols, such as, for example, IAL.io dynamically multiplexed with, for example, either IAL.cache or IAL.mem or both (other configurations are contemplated). Finally, also during link initialization, a logical sub-block 744 of the physical layer logic 742 may be configured for either PCIe mode or IAL mode. If IAL mode is enabled, any negotiated IAL latency optimizations may also be enabled. This disclosure describes a sequence to be implemented by the physical layer logic 742 for negotiating which IAL protocols and latency optimization features to enable using the PCIe alternate protocol negotiation mechanism and for subsequently notifying the upper layers so that the appropriate logic may be activated in the flex bus topology 700 as well as for enabling the appropriate logic in the logical sub-block 744 and (PCIe) electricals 744 within the physical layer logic 742. In general, the fabric 730 allows a host system to multiplex multiple protocols (e.g., Interconnect Protocol 1 or Interconnect Protocol 2) to be multiplexed onto a set of pins that use electricals associated with a single interconnect protocol (e.g., PCIe).

It is noted that the PCIe 5.0 specification defines modified Training Sequence 1/Training Sequence 2 (TS1/TS2) ordered sets to enable alternate protocol negotiation, allocating vendor defined bits that may be utilized for vendor defined alternate protocol negotiation. Tables 1 and 2, provided below, describe how the vendor defined bits of the modified TS1/TS2 ordered sets may be defined for Flex Bus negotiation, in accordance with various embodiments.

TABLE 1

Modified TS1/TS2 Ordered Set Usage for Protocol Mode Negotiation

| Symbol Number | PCIe 5.0 Spec Description | Intel Flex Bus Mode Negotiation Usage |
|---|---|---|
| 0 thru 4 | See PCIe 5.0 Base Specification | Per PCIe 5.0 Base Specification |
| 5 | Training Control<br>Bits 0:6 See PCIe 5.0 Base Spec<br>Bit 7: Modified TS1/TS2 supported<br>(see PCIe 5.0 Base Spec for details) | Bit 7 = 1 b |
| 6 | For Modified TS1: TS1 Identifier, encoded as D10.2<br>For Modified TS2: TS2 Identifier, encoded as D5.2 | TS1 Identifier during Phase 1 of Flex Bus mode negotiation<br>TS2 Identifier during Phase 2 of Flex Bus mode negotiation |
| 7 | For Modified TS1: TS1 Identifier, encoded as D10.2<br>For Modified TS2: TS2 Identifier, encoded as D5.2 | TS1 Identifier during Phase 1 of Flex Bus mode negotiation<br>TS2 Identifier during Phase 2 of Flex Bus mode negotiation |
| 8-9 | Bits 0:2: Usage (See PCIe 5.0 Base Spec)<br>Bits 3:4: Alternate Protocol Negotiation Status if Usage is 010 b, Reserved otherwise (se PCIe 5.0 Base Spec for details)<br>Bits 5:15: Alternate Protocol Details | Bits 2:0 = 010 b (indicating alternate protocols)<br>Bits 4:3 = Alternate Protocol Negotiation Status per PCIe spec<br>Bits 15:5 = Flex Bus Mode Selections, where<br>Bit 5: PCIe capable/enable<br>Bit 6: IALio capable/enable<br>Bit 7: IAL.mem capable/enable<br>Bit 8: IAL.cache capable/enable<br>Bit 9: UPI capable/enable<br>Bit 15:10: Reserved |
| 10-11 | Alternate Protocol ID/Vendor ID<br>if Usage = 010 b<br>See PCIe 5.0 Base Spec for other descriptions applicable to other Usage values | 8086 h |
| 12-14 | See PCIe 5.0 Base Spec<br>If Usage = 010 b, Specific proprietary usage | Bit 0: Client Profile<br>Bit 1: Server Profile<br>Bit 2: Sync Header Bypass capable/enable<br>Bit 3: SKP ordered Set Suppression capable/enable<br>Bit 4: Drift Buffer capable/enable<br>Bit 5: Retimer1 Bypass Path capable/enable<br>Bit 6: Retimer1 IAL aware<br>Bit 7: Retimer2 Bypass Path capable/enable<br>Bit 8: Retimer 2 IAL aware<br>Bits 23:9 |
| 15 | Se PCIe 5.0 Base Spec | |

TABLE 2

Additional Information for the Modified TS1/TS2 Ordered Sets

| Bit Field in Modified TS1/TS2 Symbols 12-14 | Description |
|---|---|
| Client Profile | This is set by the endpoint. The CPU uses this to determine compatibility. |
| Server Profile | This is set by the endpoint. The CPU uses this to determine compatibility. |
| Sync Header Bypass capable/enable | The CPU, endpoint, and any retimers advertise their capability in Phase1. The CPU communicates the results of the negotiation in Phase 2. Note: The retimer must pass this bit unmodified from its upstream port to its |

TABLE 2-continued

Additional Information for the Modified TS1/TS2 Ordered Sets

| Bit Field in Modified TS1/TS2 Symbols 12-14 | Description |
| --- | --- |
| | downstream port. The retimer clears this bit if it does not support this feature when passing from downstream port to its upstream port but it must never set it (only the endpoint may set this bit in that direction). If the retimer(s) do not advertise that they are IAL aware, the CPU assumes this feature is not supported by the retimer(s) regardless of how this bit is set. |
| SKP Ordered Set Suppression capable/enable | The CPU, endpoint, and any retimers advertise their capability in Phase1. The CPU communicates the results of the negotiation in Phase 2. Note: The retimer must pass this bit unmodified from its upstream port to its downstream port. The retimer clears this bit if it does not support this feature when passing from downstream port to its upstream port but it must never set it (only the endpoint may set this bit in that direction). If the retimer(s) do not advertise that they are IAL aware, the CPU assumes this feature is not supported by the retimer(s) regardless of how this bit is set. |
| Drift Buffer capable/enable | The CPU and endpoint advertise their capability in Phase 1. The CPU communicates the results of the negotiation in Phase 2. |
| Retimer1 Bypass Path capable/enable | Retimer1 advertises whether it supports a low latency bypass path in Phase 1. The CPU communicates that it will enable the bypass path in Phase 2. Note: The CPU will send a CTRL SKP OS after reaching L0 at the highest speed and then force an entry to Recovery. Speed where the actual switchover should happen. |
| Retimer1 IAL aware | Retimer1 advertises whether it is IAL aware in Phase 1. If it is IAL aware, it must use the "Sync Header Bypass capable/enable" bit and the "SKP Ordered Set Suppression capable/enable" bit. |
| Retimer2 Bypass path capable/enable | Retimer2 advertises whether it supports a low latency bypass path in Phase 1. The CPU communicates that it will enable the bypass path in Phase 2. Note: The CPU will send a CTRL SKP OS after reaching L0 at the highest speed and then force an entry to Recovery. Speed where the actual switchover should happen. |
| Retimer2 IAL aware | Retimer2 advertises whether it is IAL aware in Phase 1. If it is IAL aware, it must use the "Sync Header Bypass capable/enable" bit and the "SKP Ordered Set Suppression capable/enable" bit. |

In embodiments, the modified TS1/TS2 ordered sets may, for example, be used for negotiating which protocols, such as, for example, IAL protocols, should be enabled (e.g. IAL.io, IAL.mem, and IAL.cache) and to negotiate which low latency features, such as, for example, IAL low latency features, should be enabled (e.g., sync header suppression, SKP ordered set suppression, and drift buffer mode).

Figure 8A:
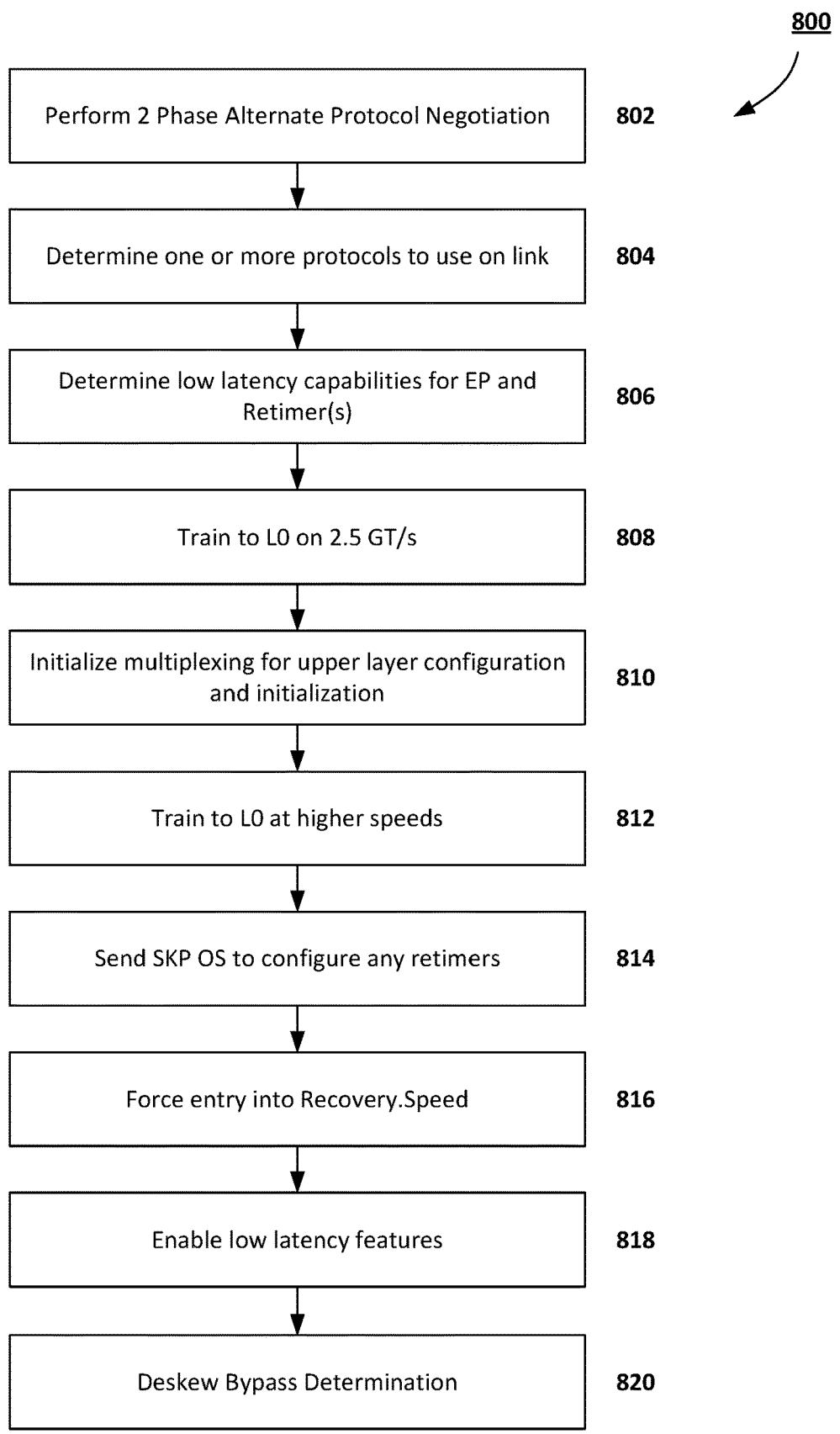
FIG. 8A is a process flow diagram for determining one or more features to enable using PCIe alternate protocol negotiation in accordance with embodiments of the present disclosure.

FIG. 8A is a process flow diagram 800 for determining one or more features to enable using PCIe alternate protocol negotiation in accordance with embodiments of the present disclosure. At the outset, a root complex can perform a two phase alternate protocol negotiation with Modified TS1/TS2 Ordered Sets during Configuration while training at 2.5 GT/s (802). In embodiments, the negotiation may include a two phase process that may occurs while in Configuration.Lanenum.Wait, Configuration.Lanenum.Accept, and Configuration.Complete before entering L0 at Gen1 Speed, per the PCIe 5.0 specification:

Phase 1: The root complex sends stream of modified TS1 Ordered Sets advertising its Flex Bus capabilities; the endpoint device responds by sending a stream of modified TS1 Ordered Sets indicating which Flex Bus capabilities it wishes to enable (any retimers may communicate its capabilities by modifying the relevant bits in the modified TS1 Ordered Sets sent by the endpoint). This exchange occurs during Configuration.Lanenum.Wait and/or Configuration.Lanenum.Accept as per the PCIe 5.0 specification. At the end of this phase, the root complex has enough information to make a final selection of which capabilities to enable. Table 3 provided below specifies the rules for resolving which low latency features to enable.

TABLE 3

Rules for Enabling IAL Low Latency Features

| IAL Low Latency Feature | Conditions for Enabling |
| --- | --- |
| Sync Hdr Bypass | All components support Common reference clock No retimer present or retimer in low latency bypass mode |
| SKP Ordered Set Insertion Suppression | All components support Common reference clock No retimer present or retimer in low latency bypass mode |

TABLE 3-continued

Rules for Enabling IAL Low Latency Features

| IAL Low Latency Feature | Conditions for Enabling |
|---|---|
| Drift Buffer (instead of elastic buffer) | SKP Ordered Set Suppression must be enabled Common reference clock |

Phase 2: The root complex sends a stream of modified TS2 Ordered Sets to the endpoint device to indicate whether the link should operate in PCIe mode or in IAL mode; for IAL mode, it also specifies which IAL protocols to enable and which low latency optimizations to enable. The endpoint acknowledges the enable request by sending modified TS2 Ordered Sets with the same Flex Bus enable bits set. In embodiments, this exchange may occur during Configuration.Complete as per the PCIe 5.0 specification.

In embodiments, the following sequence may be implemented by a Flex Bus Physical Layer Logical Sub-Block for negotiating Flex Bus features and subsequently enabling them:

The Flex Bus Physical Layer Logical Sub-Block can determine which protocol (IAL.io, IAL.cache, IAL.mem, PCIe, etc.) to use based on the received modified TS2 ordered sets the root complex receives from the endpoint device (with the flex bus enable bits set) (804).

The Flex Bus Physical Layer Logical Sub-Block can determine the low latency features for the endpoint device (806). Examples of low latency features include Drift Buffer, Sync Header Suppression, Skip (SKP) Ordered Set (OS) Suppression, etc. The Flex Bus Physical Layer Logical Sub-Block can determine whether any retimer(s) are present and whether the retimer(s) supports bypass path and any low latency features. If so, these features will be enabled after training to the highest speed; the logical PHY in the CPU will send a CTRL SKP OS with appropriate bits set after training to the highest speed to direct the retimers to enable these features on the next entry to Recovery. Speed.

The Flex Bus Physical Layer Logical Sub-Block can train the link to L0 at 2.5 GT/s and notify the upper layers of the protocol decision (808). This notification allows the static multiplexing logic and the IAL ARB/MUX logic to be configured and the appropriate upper layers to be activated and initialized properly by the time the link is initialized (810).

The Flex Bus Physical Layer Logical Sub-Block can cause the link to undergo training and equalization at the higher speeds (812). After training to L0 at 2.5 GT/s, the logical physical layer (PHY) reverts to sending regular TS1/TS2 OSs instead of the modified TS1/TS2 OSs since the alternate protocol negotiation is already complete. The higher speed training can also include training the link to L0 at the highest speed.

The Flex Bus Physical Layer Logical Sub-Block can send a control SKP OS with appropriate bits sets indicating that any retimers should enable any low latency features (including bypass path) that were agreed upon in Recovery. Speed (814).

The Flex Bus Physical Layer Logical Sub-Block can cause a speed change (rate remains the same) to force entry to Recovery. Speed (816). Upon entry to Recovery. Speed, the retimer(s) enable bypass path and low latency features, if agreed upon during alternate protocol negotiation and if so directed by control SKP OS in step 4). Upon entry to Recovery. Speed, the Flex Bus logical PHY enables any low latency features that were agreed upon during alternate protocol negotiation (e.g. drift buffer, sync header suppression, and SKP OS suppression) (818).

The Flex Bus Physical Layer Logical Sub-Block can cause a deskew bypass determination during recovery after Recovery. Speed (820). If eligible, the deskew bypass path will be activated upon exit from recovery. Deskew bypass is a low latency optimization that is not negotiated; it is determine locally by the Flex Bus Logical Sub-Block.

Figure 8B:
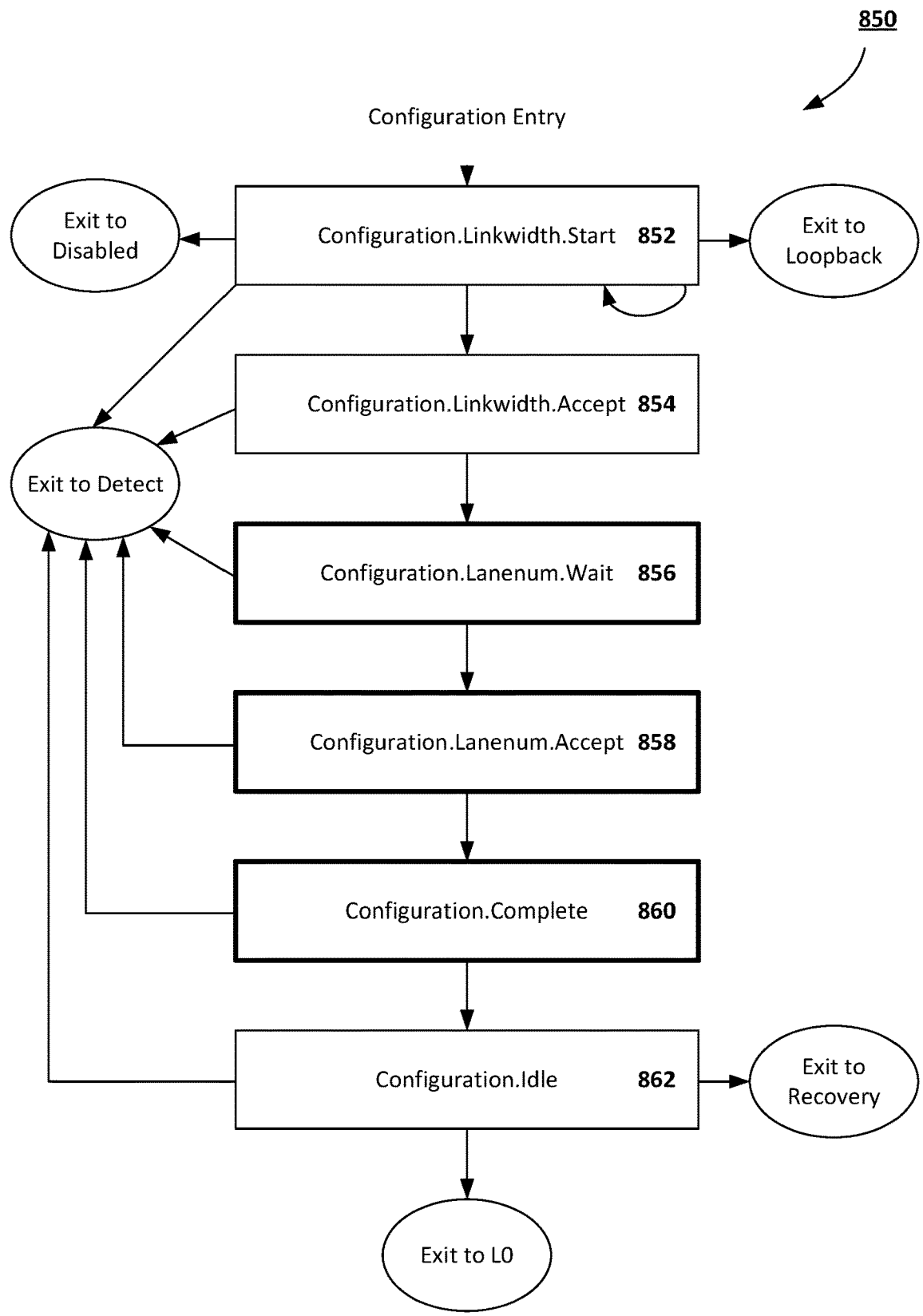
FIG. 8B is a diagram illustrating sub-states in an example link training state machine.

FIG. 8B is a diagram illustrating substates in an example link training state machine. In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. The PCIe LTSSM may be used to negotiate the protocol by using modified PCIe Training Sets (e.g., TS1 and TS2) after the link width negotiation and (at least partially) in parallel with lane numbering performed during the Config state.

For instance, as shown in FIG. 8B, a diagram 850 is illustrated showing substates of a PCIe Config state. In this example, a Configuration.Linkwidth.Start substate 852 and a Configuration.Linkwidth.Accept substate 854 may be provided in which the link width is configured. These substates may involve the sending of training sequences, as would be conventionally accomplished during PCIe link training. Upon configuring the link width, additional substates (e.g., 856, 858, 860, etc.) may be provided. One or more of these Config substates may be used to enable multi-protocol negotiation. For instance, upon transitioning to one of Config substates (e.g., 856, 858, 860) subsequent to configuration of the link width, an enhanced or modified training sequence may be introduced with fields or symbols configured for communicating protocol determination information. The physical layer logic of each of the devices may process the received information to determine the supported protocols of the participating devices prior to the conclusion of the configuration state (e.g., before the transitioning from the Configuration.Complete substate 860), among other examples. This example may additionally allow such protocol negotiation to be facilitated in a backwards compatible way such that legacy or other devices, which do not support such functionality may be identified, and the communication tailored to the functionality of the other device, among other examples.

Figure 9:
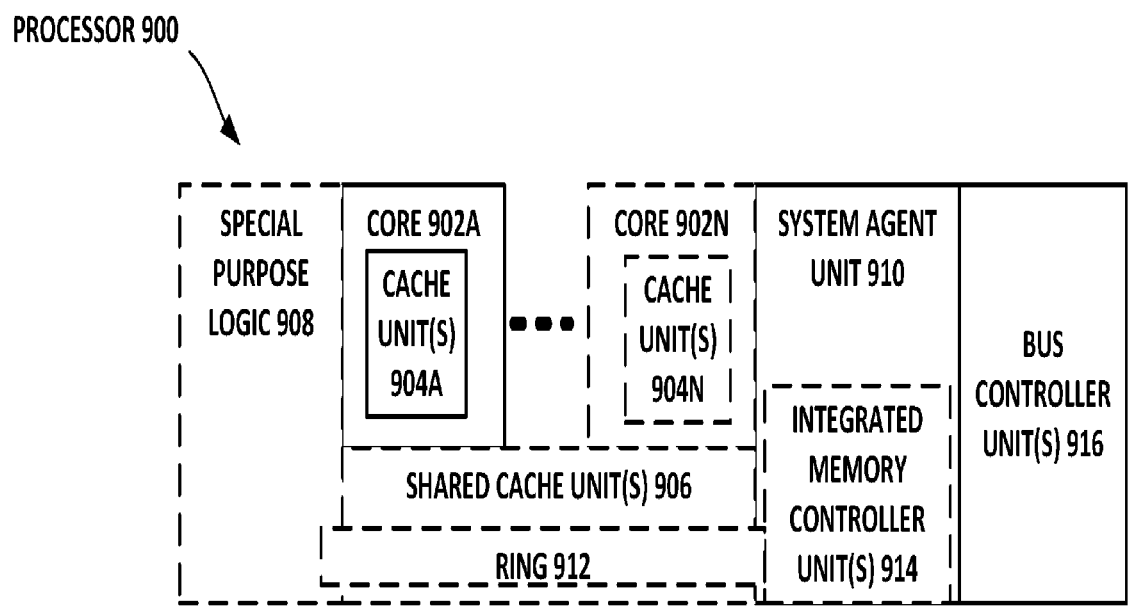
FIG. 9 is a block diagram of a processor that may have more than one core, may have an integrated memory controller, and may have integrated graphics according to various embodiments.

FIG. 9 is a block diagram of a processor 900 that may have more than one core, may have an integrated memory controller, and may have integrated graphics according to various embodiments. The solid lined boxes in FIG. 9 illustrate a processor 900 with a single core 902A, a system agent 910, and a set of one or more bus controller units 916; while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 900 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic (e.g., integrated graphics logic) 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

FIGS. 10-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 10:
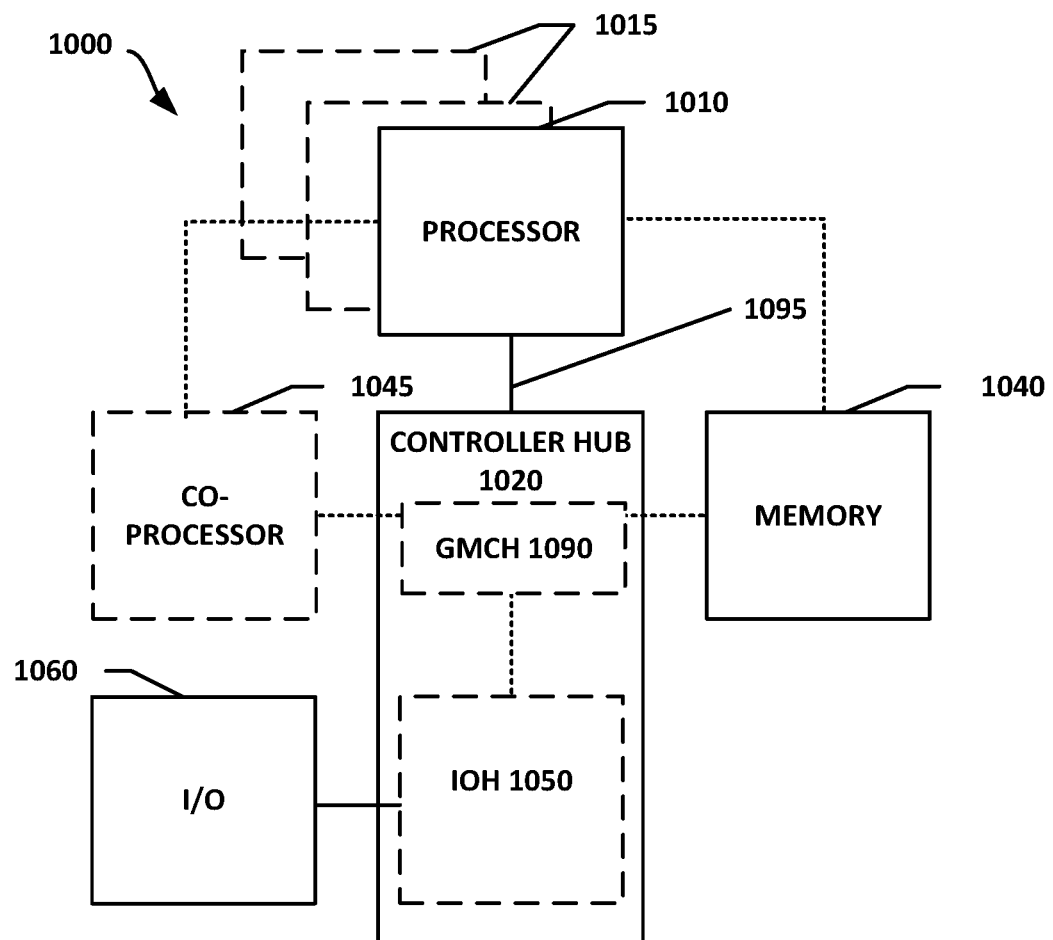
FIG. 10 depicts a block diagram of a system in accordance with one embodiment of the present disclosure.

FIG. 10 depicts a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips or the same chip); the GMCH 1090 includes memory and graphics controllers coupled to memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 is a single chip comprising the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), other suitable memory, or any combination thereof. The memory 1040 may store any suitable data, such as data used by processors 1010, 1015 to provide the functionality of computer system 1000. For example, data associated with programs that are executed or files accessed by processors 1010, 1015 may be stored in memory 1040. In various embodiments, memory 1040 may store data and/or sequences of instructions that are used or executed by processors 1010, 1015.

In at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression and/or decompression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
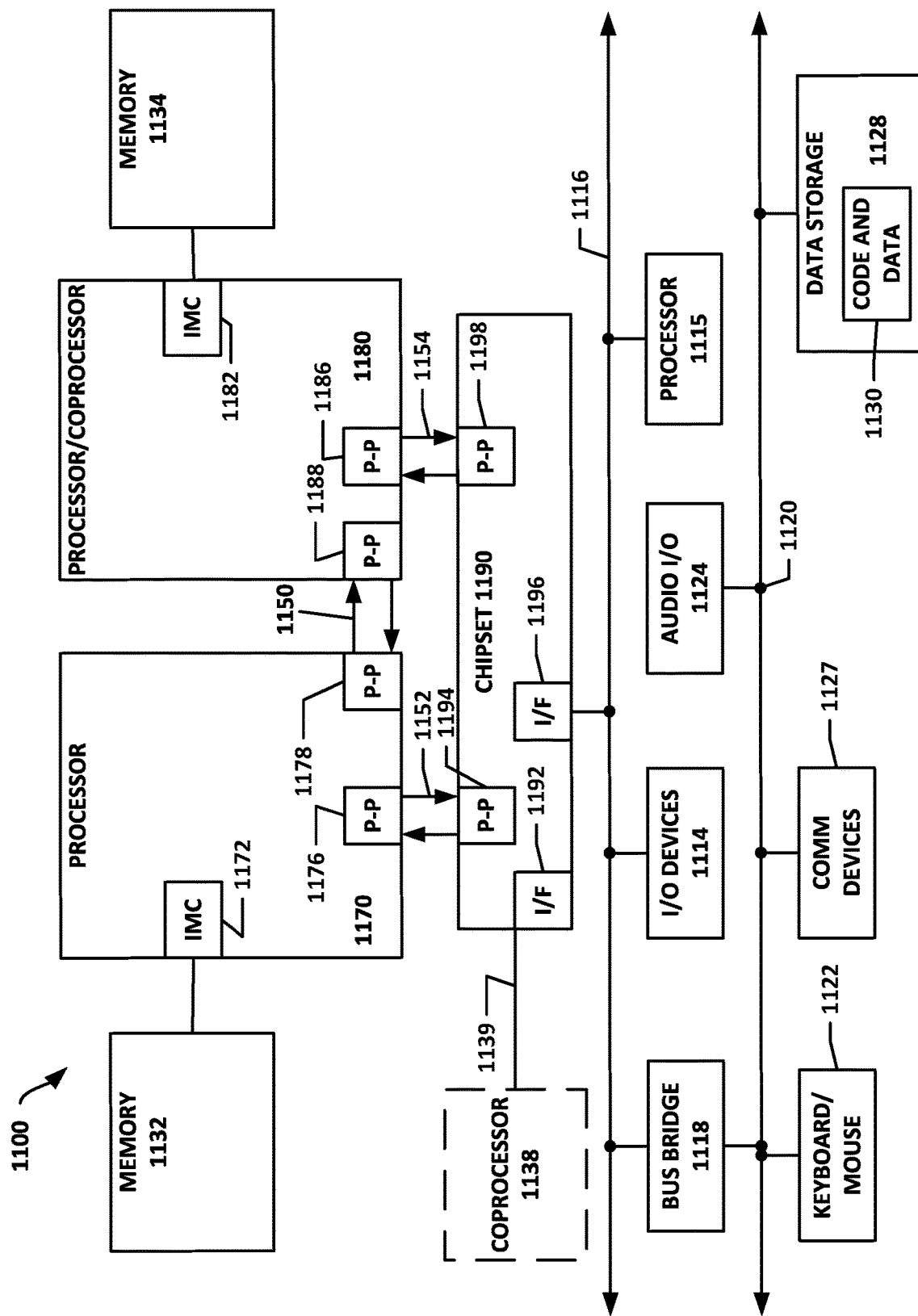
FIG. 11 depicts a block diagram of a first more specific exemplary system in accordance with an embodiment of the present disclosure.

FIG. 11 depicts a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 1000. In one embodiment of the disclosure, processors 1170 and 1180 are respectively processors 1110 and 1115, while coprocessor 1138 is coprocessor 1145. In another embodiment, processors 1170 and 1180 are respectively processor 1110 and coprocessor 1145.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are contemplated by this disclosure. For example, instead of the point-to-point architecture of FIG. 11, a system may implement a multi-drop bus or other such architecture.

Figure 12:
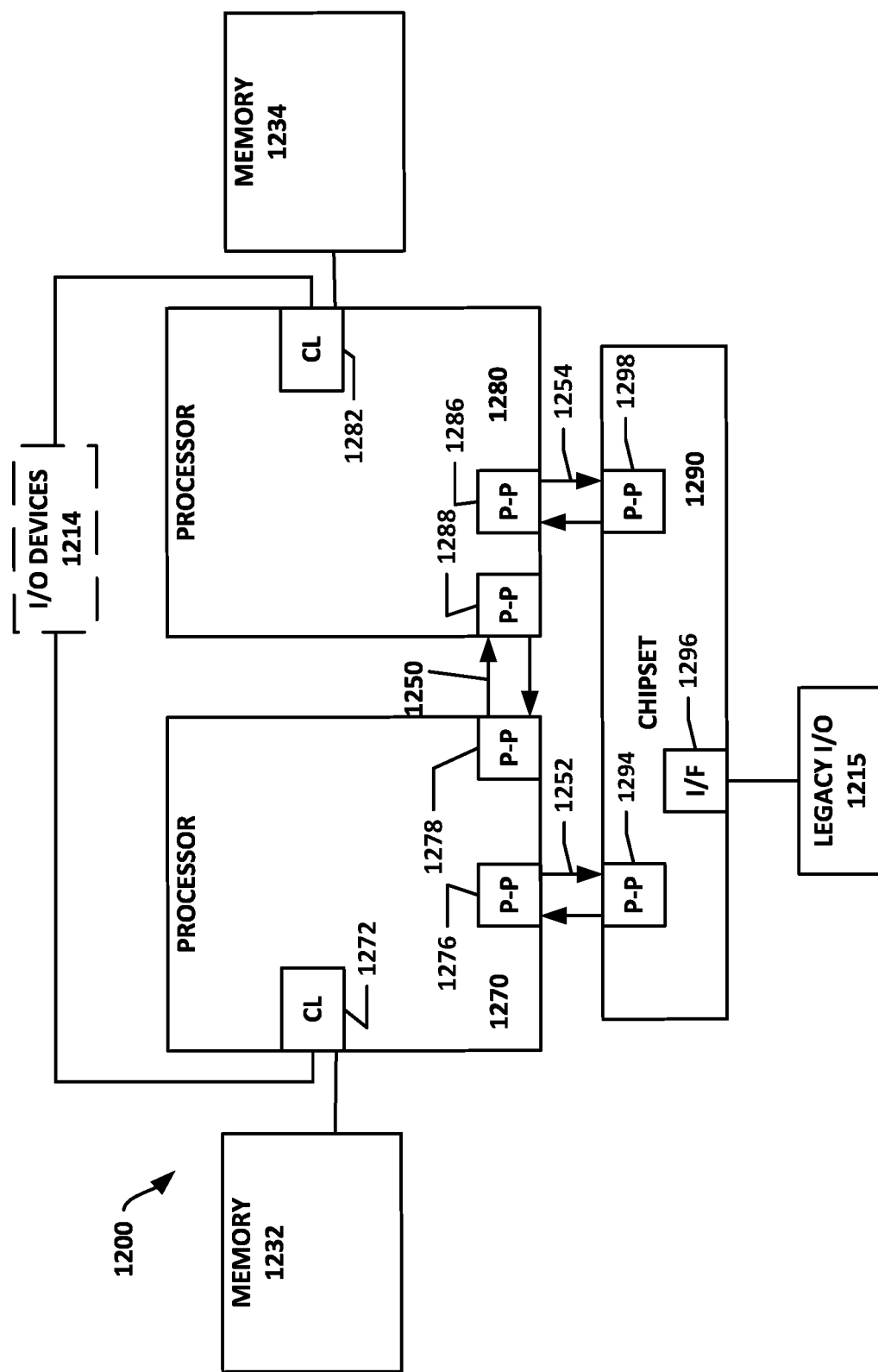
FIG. 12 depicts a block diagram of a second more specific exemplary system 1300 in accordance with an embodiment of the present disclosure.

FIG. 12 depicts a block diagram of a second more specific exemplary system 1200 in accordance with an embodiment of the present disclosure. Similar elements in FIGS. 11 and 12 bear similar reference numerals, and certain aspects of FIG. 11 have been omitted from FIG. 12 in order to avoid obscuring other aspects of FIG. 12.

FIG. 12 illustrates that the processors 1270, 1280 may include integrated memory and I/O control logic ("CL") 1272 and 1282, respectively. Thus, the CL 1272, 1282 include integrated memory controller units and include I/O control logic. FIG. 12 illustrates that not only are the memories 1232, 1234 coupled to the CL 1272, 1282, but also that I/O devices 1214 are also coupled to the control logic 1272, 1282. Legacy I/O devices 1215 are coupled to the chipset 1290.

Figure 13:
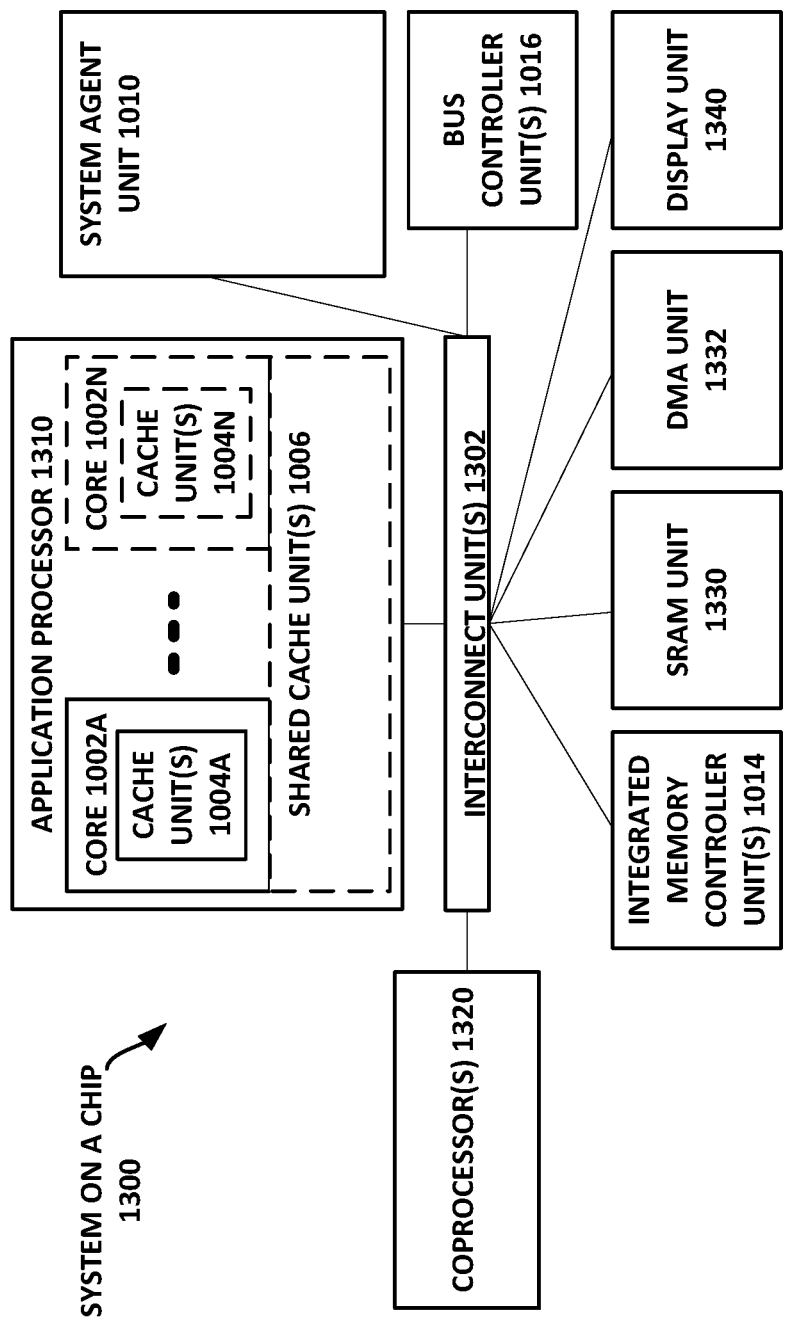
FIG. 13 depicts a block diagram of a SoC in accordance with an embodiment of the present disclosure.

FIG. 13 depicts a block diagram of a SoC 1300 in accordance with an embodiment of the present disclosure. Also, dashed lined boxes are optional features on more advanced SoCs. In FIG. 13, an interconnect unit(s) 1302 is coupled to: an application processor 1608 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1610; a direct memory access (DMA) unit 1332; and a display unit 1626 for coupling to one or more external displays. In one embodiment, the coprocessor(s) 1320 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
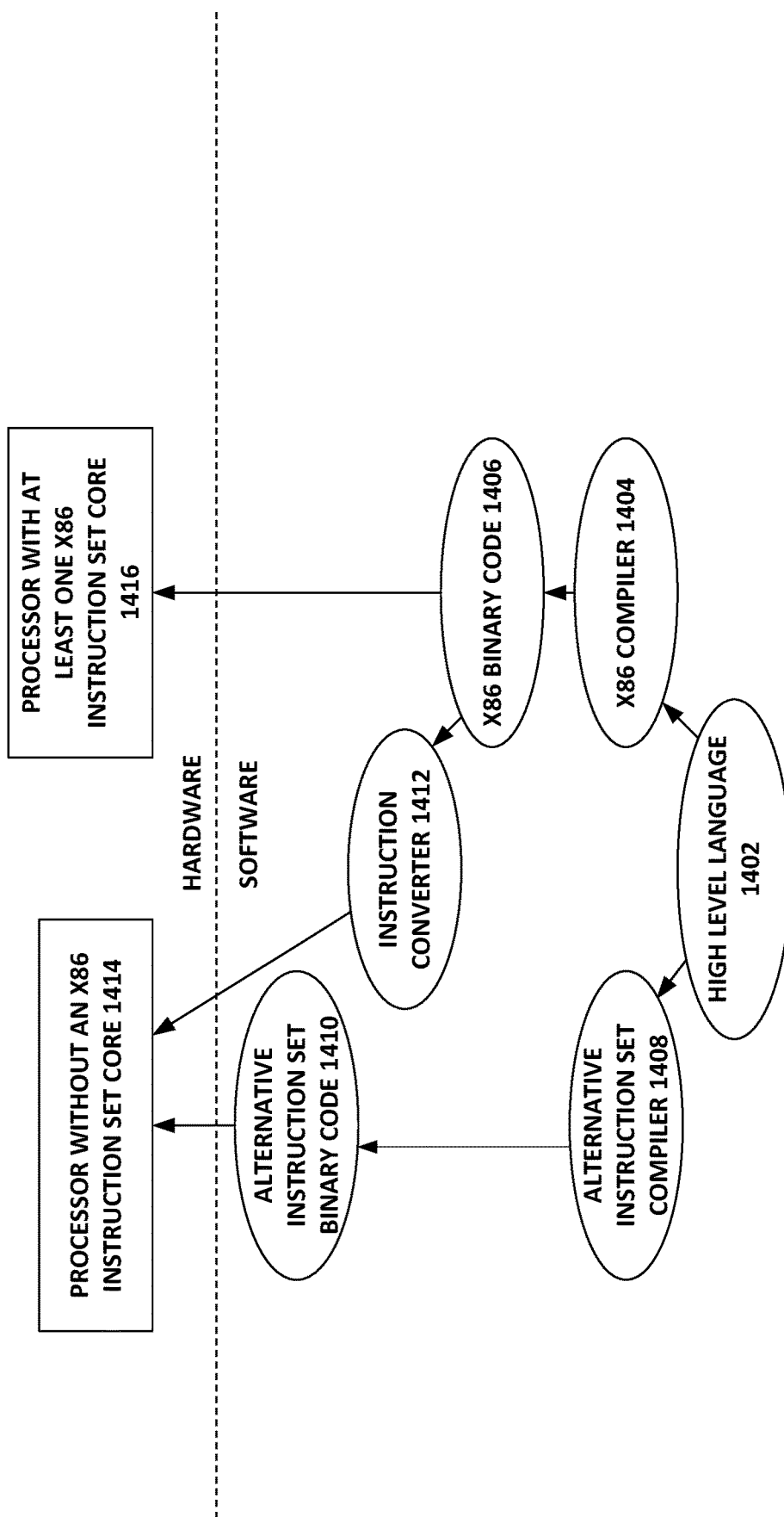
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In this detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

The systems, methods, computer program products, and apparatuses can include one or a combination of the following examples:

Example 1 may include an apparatus for computing, comprising a flex bus link; and a flex bus stack coupled to the flex bus link, the flex bus stack including multiplexing logic to select either a PCIe upper layer mode, or an accelerator link protocol upper layer mode, to communicate over the flex bus link.

Example 2 may include the apparatus for computing of example 1, and/or any other example herein, wherein the multiplexing logic is to perform the selection during link initialization.

Example 3 may include the apparatus for computing of example 1, and/or any other example herein, wherein if the accelerator link mode are selected, the multiplexing logic is further to enable either a single protocol, or multiple protocols.

Example 4 may include the apparatus for computing of example 1, and/or any other example herein, wherein if the accelerator link mode is selected, the apparatus is further to enable latency optimizations.

Example 5 may include the apparatus for computing of examples 3 and 4, and/or any other example herein, wherein modified PCIe 5.0 Training Set 1/Training Set 2 (TS1/TS2) ordered sets are used to negotiate which accelerator link protocols are to be enabled.

Example 6 may include the apparatus for computing of example 5, and/or any other example herein, wherein modified PCIe TS1/TS2 ordered sets are further used to negotiate which accelerator link low latency features are to be enabled.

Example 7 may include the apparatus for computing of example 5, and/or any other example herein, wherein the accelerator link protocols include one or more of: IAL.io, IAL.mem and IAL.cache.

Example 8 may include the apparatus for computing of example 6, and/or any other example herein, wherein the low latency features include one or more of: sync header suppression, skip (SKP) ordered set suppression, and drift buffer mode.

Example 9 may include the apparatus for computing of example 5, and/or any other example herein, wherein the negotiation comprises a two phase process, to occur while in PCIe 5.0 Configuration.Lanenum.Wait, Configuration.Lanenum.Accept, and Configuration.Complete, and before entering L0 at Gen1 Speed.

Example 10 may include the apparatus for computing of example 9, and/or any other example herein, wherein the first phase includes to: receive, from a root complex, a stream of modified TS1 Ordered Sets providing flex bus capabilities, and send, by the apparatus to the root complex, a stream of modified TS1 Ordered Sets indicating which flex bus capabilities to enable.

Example 11 may include the apparatus for computing of example 10, and/or any other example herein, wherein the first phase is to occur during PCIe 5.0 Configuration.Lanenum.Wait or Configuration.Lanenum.Accept.

Example 12 may include the apparatus for computing of example 10, and/or any other example herein, wherein the second phase includes to: receive, from a root complex, an enable request including a stream of modified TS2 Ordered Sets indicating whether the flex bus link is to operate in PCIe upper layer mode or an accelerator link protocol upper layer mode, send, by the apparatus to the root complex, a stream of modified TS2 Ordered Sets with the same flex bus enable bits to acknowledge the enable request.

Example 13 may include the apparatus for computing of example 12, and/or any other example herein, wherein the second phase is to occur during PCIe 5.0 Configuration.Complete.

Example 14 may include one or more non-transitory computer-readable storage media comprising a plurality of instructions that in response to being executed cause multiplexing logic coupled to a flex bus link to select either PCIe upper layer mode, or an accelerator link protocol upper layer mode, to communicate over the flex bus link.

Example 15 may include the one or more non-transitory computer-readable storage media of example 14, and/or any other example herein, further comprising instructions that in response to being executed cause the multiplexing logic to perform the selection during link initialization.

Example 16 may include the one or more non-transitory computer-readable storage media of example 14, and/or any other example herein, further comprising instructions that in response to being executed cause the multiplexing logic, if the accelerator link mode was selected, to enable either a single protocol, or multiple protocols.

Example 17 may include the one or more non-transitory computer-readable storage media of example 14, and/or any other example herein, further comprising instructions that in response to being executed cause the multiplexing logic, if the accelerator link mode was selected, to enable latency optimizations.

Example 18 may include the one or more non-transitory computer-readable storage media of example 16, and/or any other example herein, wherein modified PCIe 5.0 Training Set 1/Training Set 2 (TS1/TS2) ordered sets (OS) are used to negotiate which accelerator link protocols are to be enabled.

Example 19 may include the one or more non-transitory computer-readable storage media of example 17, and/or any other example herein, wherein modified PCIe TS1/TS2 ordered sets are further used to negotiate which accelerator link low latency features are to be enabled.

Example 20 may include the one or more non-transitory computer-readable storage media of example 18, and/or any other example herein, wherein the accelerator link protocols include one or more of: IAL.io, IAL.mem and IAL.cache.

Example 21 may include the a the one or more non-transitory computer-readable storage media of example 19, and/or any other example herein, wherein the low latency features include one or more of: sync header suppression, skip (SKP) ordered set suppression, and drift buffer mode.

Example 22 may include the one or more non-transitory computer-readable storage media of example 19, and/or any other example herein, wherein the negotiation comprises a two phase process, to occur while in PCIe 5.0 Configuration.Lanenum.Wait, Configuration.Lanenum.Accept, and Configuration.Complete, and before entering L0 at Gen1 Speed.

Example 23 may include the one or more non-transitory computer-readable storage media of example 22, and/or any other example herein, wherein the first phase includes to receive, from a root complex, a stream of modified TS1 Ordered Sets providing flex bus capabilities, and send, by the apparatus to the root complex, a stream of modified TS1 Ordered Sets indicating which flex bus capabilities to enable.

Example 24 may include the one or more non-transitory computer-readable storage media of example 23, and/or any other example herein, wherein the first phase is to occur during PCIe 5.0 Configuration.Lanenum.Wait or Configuration.Lanenum.Accept.

Example 25 may include the one or more non-transitory computer-readable storage media of example 22, and/or any other example herein, wherein the second phase includes to receive, from a root complex, an enable request including a stream of modified TS2 Ordered Sets indicating whether the flex bus link is to operate in PCIe upper layer mode or an accelerator link protocol upper layer mode, send, by the apparatus to the root complex, a stream of modified TS2 Ordered Sets with the same flex bus enable bits to acknowledge the enable request.

Example 26 may include the one or more non-transitory computer-readable storage media of example 25, and/or any other example herein, wherein the second phase is to occur during PCIe 5.0 Configuration.Complete.

Example 27 is an apparatus comprising a flex bus link; and a flex bus stack coupled to the flex bus link, the flex bus stack comprising: multiplexing logic to select one of a Peripheral Component Interconnect Express (PCIe) upper layer mode, or an accelerator link protocol upper layer mode, the PCIe upper layer mode or the accelerator link protocol upper layer mode to communicate over the flex bus link, and physical layer logic to determine one or more low latency features associated with one or both of the PCIe upper layer mode or the accelerator link protocol upper layer mode.

Example 28 is one or more non-transitory computer-readable storage media comprising a plurality of instructions that in response to being executed cause multiplexing logic coupled to a flex bus link to select either Peripheral Component Interconnect Express (PCIe)-based upper layer mode, or an accelerator link protocol upper layer mode, to communicate over the flex bus link; and cause physical layer logic coupled to a flex bus link to determine one or more low latency features associated with one or both of the PCIe upper layer mode or the accelerator link protocol upper layer mode.

Example 29 is a system comprising a host device, the host device comprising a root complex; a flex bus link; and a flex bus stack coupled to the flex bus link, the flex bus stack comprising multiplexing logic to select one of a Peripheral Component Interconnect Express (PCIe) upper layer mode, or an accelerator link protocol upper layer mode, the PCIe upper layer mode or the accelerator link protocol upper layer mode to communicate over the flex bus link, and physical layer logic to determine one or more low latency features associated with one or both of the PCIe upper layer mode or the accelerator link protocol upper layer mode; and an endpoint device, the endpoint device coupled to the host device across the flex bus link.

Example 30 may include the subject matter of example 29, wherein the root complex is to transmit to the endpoint device a first set of modified training set (TS) 1 ordered sets, the first set of TS1 ordered sets comprising an advertisement of one or more flex bus capabilities for the flex bus link; and receive, from the endpoint device, a second set of modified TS1 ordered sets, the second set of modified TS1 ordered sets identifying one or more flex bus capabilities to activate.

Example 31 may include the subject matter of example 29 or 30, wherein the root complex is to transmit a first set of modified TS2 ordered sets to the endpoint device, the first set of modified TS2 ordered sets indicating whether the endpoint device should operate in PCIe mode or accelerator link mode; and receive a second set of modified TS2 ordered sets from the endpoint device, the second set of modified TS2 ordered sets indicating a PCIe mode or an accelerator link mode.

Example 32 may include the subject matter of example 31, wherein the received second set of modified TS2 ordered sets indicates the accelerator link mode is selected by the endpoint, and wherein the physical layer logic is to activate low latency features settings associated with the accelerator link mode, the low latency features settings indicating one or more low latency features comprising one or more of sync header suppression, skip (SKP) ordered set suppression, and drift buffer mode.

Example 33 is a method comprising selecting, by multiplexing logic, one of a Peripheral Component Interconnect Express (PCIe) upper layer mode, or an accelerator link protocol upper layer mode, the PCIe upper layer mode or the accelerator link protocol upper layer mode to communicate over the flex bus link, and physical layer logic to determining, by flex bus physical layer logic, one or more low latency features associated with one or both of the PCIe upper layer mode or the accelerator link protocol upper layer mode.

What is claimed is:

1. An apparatus comprising:
a port to couple to a link, wherein the link couples the port to a device, and the port comprises:
physical layer circuitry to support a plurality of modes, wherein each one of the plurality of modes corresponds to a respective one of a plurality of interconnect protocols; and
protocol circuitry to support each of the plurality of interconnect protocols, wherein the protocol circuitry is to:
send a first stream of modified TS2 ordered sets to the device on the link, wherein the modified TS2 ordered sets comprise a particular set of symbols to advertise that the link is capable of operating in one or more of the plurality of modes, wherein a Peripheral Component Interconnect Express (PCIe)-based protocol is to be enabled in a first one of the plurality of modes, an input/output (I/O) protocol is to be used in a second one of the plurality of modes, a caching protocol is to be used in a third one of the plurality of modes, and a memory access protocol is to be used in a fourth one of the plurality of modes; and
receive a second stream of modified TS2 ordered sets from the device, wherein the particular set of symbols is encoded in the second stream of modified TS2 ordered sets to match the particular set of symbols in the first stream of modified TS2 ordered sets and acknowledge a request to enable the one or more of the plurality of modes.

2. The apparatus of claim 1, wherein the first stream of modified TS2 ordered sets and the second stream of modified TS2 ordered sets are communicated on the link while the link is in a configuration state.

3. The apparatus of claim 2, wherein the configuration state is entered prior to entering an active L0 state, and data is to be communicated in the active L0 state based on a particular one of the plurality of interconnect protocols corresponding to the particular mode.

4. The apparatus of claim 1, wherein the I/O protocol comprises another PCIe based protocol different from the PCIe based protocol.

5. The apparatus of claim 1, wherein the physical layer circuitry is to enable the particular mode based on the acknowledgment.

6. The apparatus of claim 1, wherein plurality of interconnect protocols are to share a PCIe-based physical layer.

7. The apparatus of claim 1, wherein the particular set of symbols is encoded to advertise that the link is to operate in two or more of the plurality of modes and the two or more of the plurality of modes comprise two or more of the second, third, or fourth modes.

8. The apparatus of claim 7, wherein the port further comprises multiplexer circuitry to multiplex data of the interconnect protocols of the two or more of the plurality of modes.

9. The apparatus of claim 1, wherein the I/O protocol, the caching protocol, and the memory access protocol are sub-protocols of an accelerator link protocol.

10. The apparatus of claim 1, wherein the protocol circuitry is further to initiate a mode negotiation, the mode negotiation comprises a first phase and a second phase, the second phase follows the first phase in the mode negotiations, and the second phase comprises the sending of the first stream of modified TS2 ordered sets and the receiving of the second stream of modified TS2 ordered sets.

11. The apparatus of claim 10, wherein the first phase comprises sending a first stream of modified TS1 ordered sets to the device and receiving a second stream of modified TS1 ordered sets from the device on the link.

12. The apparatus of claim 1, further comprising a host device, wherein the host device comprises a processor core and the port.

13. The apparatus of claim 12, wherein the device comprises an accelerator device.

14. A method comprising:
   entering a configuration link state for a link coupling a first device to a second device;
   encoding a particular field in each one of a first stream of modified TS2 ordered sets to indicate a particular one of a plurality of modes of operation for the link, wherein a Peripheral Component Interconnect Express (PCIe)-based protocol is to be used in a first one of the plurality of modes, a different I/O protocol is to be used in a second one of the plurality of modes, a caching protocol is to be used in a third one of the plurality of modes, and a memory access protocol is to be used in a fourth one of the plurality of modes;
   sending the first stream of modified TS2 ordered sets from the first device to the second device on the link in the configuration link state; and
   receiving a second stream of modified TS2 ordered sets from the second device on the link in the configuration link state, wherein the modified TS2 ordered sets in the second stream also include the particular field, and the particular field in the second stream of modified TS2 ordered sets is encoded to also identify the particular mode of operation for the link to acknowledge the use of the particular mode of operation.

15. The method of claim 14, further comprising:
   entering an active link state; and
   communicating data over the link using an interconnect protocol corresponding to the particular mode of operation.

16. The method of claim 15, wherein the particular field is encoded to indicate that two or more of the plurality of modes of operation for the link are to be used, and the method further comprises multiplexing data on the link according to two or more protocols associated with the two or more modes.

17. A system comprising:
   a first device; and
   a second device coupled to the first device by a link, wherein the second device comprises protocol circuitry to support a plurality of interconnect protocols, wherein the protocol circuitry is to:
      send a first stream of modified TS2 ordered sets to the first device on the link, wherein the modified TS2 ordered sets comprise a particular set of symbols to advertise that the link is to operate in a particular one of the plurality of modes, wherein a Peripheral Component Interconnect Express (PCIe)-based protocol is to be used in a first one of the plurality of modes, an input/output (I/O) protocol is to be used in a second one of the plurality of modes, a caching protocol is to be used in a third one of the plurality of modes, and a memory access protocol is to be used in a fourth one of the plurality of modes; and
      receive a second stream of modified TS2 ordered sets from the device, wherein the particular set of symbols is encoded in the second stream of modified TS2 ordered sets as an acknowledgement of the particular mode advertised in the first stream of modified TS2 ordered sets; and
      communicate with the first device over the link using a particular one of the plurality of interconnect protocols associated with the particular mode.

18. The system of claim 17, wherein the first device or the second device comprises a hardware accelerator.

19. The system of claim 17, wherein the first device or the second device comprises a host processor.

20. The system of claim 17, wherein the second device further comprises physical layer circuitry to implement a PCIe-based physical layer, and any one of the plurality of interconnect protocols is adapted to use the PCIe-based physical layer.

* * * * *